Patented Nov. 17, 1942

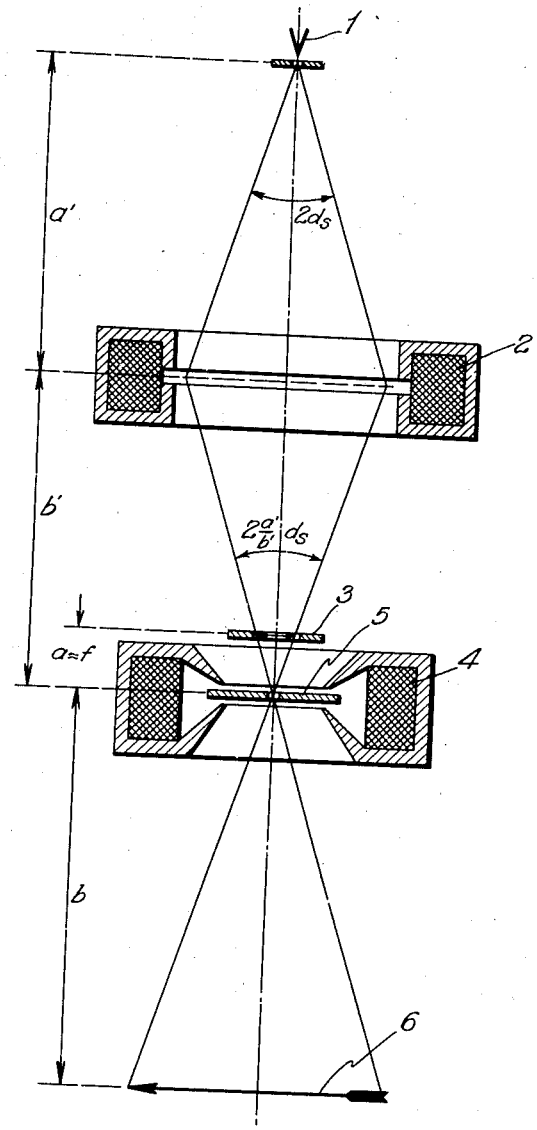

2,301,975

UNITED STATES PATENT OFFICE 2,301,975

ELECTRONIC MICROSCOPE

Ernst Ruska, Berlin-Spandau, Germany; vested in the Alien Property Custodian

Application August 20, 1940, Serial No. 353,337
In Germany July 22, 1939

4 Claims. (Cl. 250—49.5)

This invention relates to improvements in electronic microscopes.

Electronic microscopes are known in the art in which a cathode produces electron rays which after being converged by a condenser lens, pass through the object and thence through an electron-optical lens system serving to produce a magnified image of the object. The lens system comprises an objective lens arranged in proximity to the object to be studied. To attain an image free of faults by such electronic microscopes, the objective lens should have a diaphragm opening as small as possible. However, in the electronic microscopes hitherto known, the small objective diaphragms tends to limit the field of vision to an undesirable extent.

An object of the invention is to provide a microscope arrangement in which the observable area of the object image is larger than the diaphragm openings of the objective lens. This is accomplished, according to the invention, by illuminating the object in such a manner that the electron rays converge towards the object and have their point of convergence in the plane of the objective diaphragm. Since the point of convergence coincides with the image of the cathode produced by the condenser lens, the focal length of this lens is so chosen according to the invention that the image of the cathode lies in the opening of the objective diaphragm. In this arrangement the area of the object through which the rays pass may be made wider than the opening of the objective diaphragm. If the cathode is sufficiently small, the cross-section of the rays in the objective diaphragm is sufficiently small at this point even without employing a diaphragm and the image is accordingly free of faults.

To cause the rays to strike the object in the electronic microscope as a convergent beam, it is therefore preferable to employ a cathode of a very small size and, preferably, of pointed shape so as to emit a cone-shaped beam of rays covering an angle of sufficient magnitude. When employing such a cathode, each point of the object is struck by an approximately needle-shaped beam which converges towards the center of the objective diaphragm and passes through a larger zone of the object than corresponds to the opening of the objective diaphragm. A pointed cold cathode, for instance a tungsten cathode, may be employed to advantage. Such a cathode has also the advantage that the customary heat source is omitted and possibly also the control electrode and the source of the control voltage heretofore necessary in electron microscopes.

In the accompanying drawing is shown, as an embodiment of the invention, a longitudinal sectional view of the essential parts of an electronic microscope equipped with magnetic lenses. 1 denotes the cathode from which an electron ray is emitted at an aperture angle of $2\alpha_s$. The cathode consists, for instance, of a pointed tungsten body and is of the cold type. The electron rays are converged by means of a condenser coil 2 and pass through a foil or diaphragm 3 which carries the object. In the path of ray is arranged an objective coil 4 provided with an objective diaphragm 5. 6 denotes the image produced by the objective lens. This image can be rendered visible by means of a fluorescent screen, or it may serve as an intermediate image and be further magnified with the aid of a projection lens. Such screens and additional lenses are well known and not part of the invention proper; hence they are not illustrated in the drawing.

$a$ designates the distance of the object or object foil 3 from the objective diaphragm 5 and is approximately equal to the focal length $f$ of the objective lens 4. $a'$ is the distance of the electron source 1 from the condenser lens, $b'$ the distance between the condenser lens and the objective diaphragm, and $b$ the distance between the objective diaphragm and the image 6. If $d_k$ is the diameter of the cathode, $d_o$ that of the illuminated area of the object, and $d_{oB}$ the diameter of the opening in the objective diaphragm, the following formula is applicable:

$$d_k \frac{b}{a} \leqq d_{oB}$$

$$d_o = 2\frac{a'}{b'}\alpha_s a \approx 2\frac{a'}{b'}\alpha_s f$$

As will be seen from the drawing the point at which the electron rays converge behind the condenser lens lies in the opening of the objective diaphragm 5.

The radius of curvature of a pointed cathode, such as a tungsten unic-crystal filament, amounts to $10^{-4}$ mm., i. e., $d_k = 2 \times 10^{-4}$ mm. The aperture $d_o$ (free of faults) of magnetic objectives amounts to about $10^{-3}$. With a focal length of the objective $f_o = 5$ mm., the objective diaphragm should have a diameter $d_{oB} = 2\alpha_o f_o = 2 \cdot 10^{-3} \cdot 5 = 0.01$ mm. For the projection of the cathode image onto the plane of the aperture of the opening objective diaphragm, a magnification $$\frac{b'}{a'} = \frac{d_{oB}}{d_k} = \frac{10^{-2} \text{ mm.}}{2 \times 10^{-4} \text{ mm.}} = 50$$

must therefore be chosen. If the aperture of the pointed cathode amounts to $\alpha_s = 0.2$, the aperture of the beam, when passing through the objective diaphragm, is $$\frac{a'}{b'}\alpha_s = \frac{0.2}{50} = 0.004$$

The diameter of the illuminated and magnified area of the object through which the rays pass is as follows:

$$d_o = 2\frac{a'}{b'}\alpha s . f_o = 2 \times 0.004 \times 5 = 0.04 \text{ mm.}$$

whereas the diameter of the opening in the objective diaphragm is only $d_{oB} = 0.01$ mm.

While the illustrated example contains magnetic lens coils, the invention is likewise applicable with lens diaphragms of the electrostatic type.

What is claimed is:

1. An electronic microscope having an electron source for producing an electron beam, means for holding an object in the path of the beam, a condenser lens for converging the beam towards the object, and an objective lens arranged for causing the beam to produce a magnified image of the object and having a diaphragm with a central opening coaxial with the beam, said object-holding means and said objective being arranged immediately adjacent to each other at a distance similar to the focal length of said objective lens, and said condenser lens having a focal length so chosen as to cause said beam to converge through a point in the plane of said diaphragm opening.

2. An electronic microscope having a pointed source of a corpuscular beam, means for holding an object in the path of the beam, a condenser lens for converging the beam towards the object, and an objective lens arranged for causing the beam to produce a magnified image of the object and having a diaphragm with a central opening coaxial with the beam, said object-holding means being arranged closer to said objective lens than to said condenser lens, and said condenser lens having a focal length so chosen as to produce an image of said source in the plane and within the opening of said diaphragm.

3. An electronic microscope having a source of a corpuscular beam, means for holding an object in the path of the beam, a condenser lens for converging the beam towards the object, and an objective lens arranged for causing the beam to produce a magnified image of the object and having a diaphragm with a central opening coaxial with the beam, said condenser lens having a focal length so chosen as to produce a point of convergence of the beam behind the object, and said diaphragm opening having a diameter smaller than that of the object area illuminated by the beam.

4. An electronic microscope having a cathode for producing an electron beam, a condenser lens of great focal length for converging the beam, means for holding an object in the path of the converging beam, and an objective lens of small focal length for causing the beam to produce a magnified image of the object, said holding means being arranged between said condenser lens and said objective lens at a distance from said objective lens approximately equal to the focal length of said objective lens, said objective lens having a diaphragm with a central opening coaxial to the beam, and said focal length of said condenser lens being adjusted to produce a point of convergence of the beam substantially in the plane of said central opening.

ERNST RUSKA.